N. SATO.
ILLUMINATED AQUARIUM.
APPLICATION FILED JUNE 14, 1918.
1,297,254.
Patented Mar. 11, 1919.
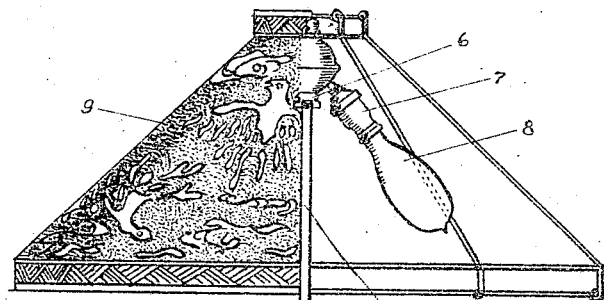
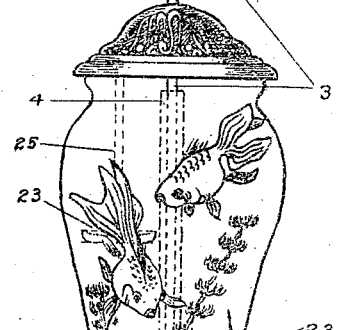
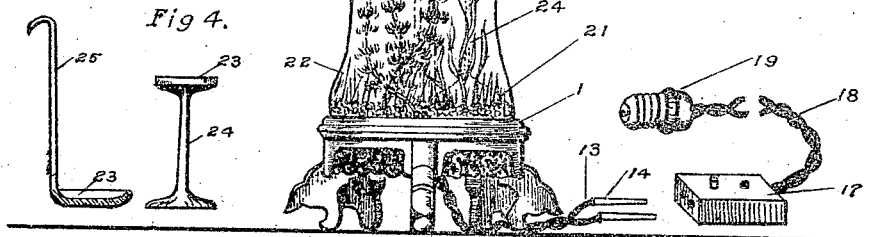
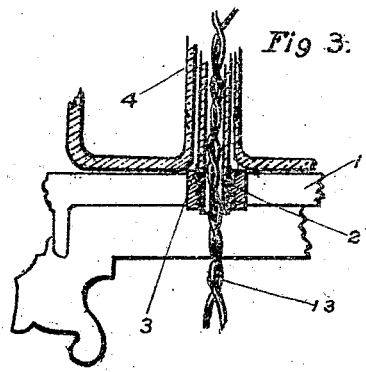
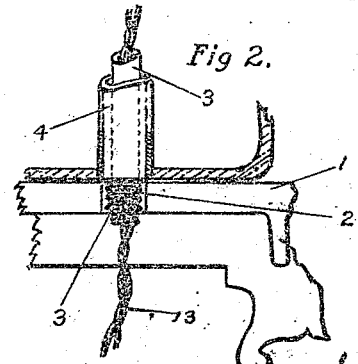

UNITED STATES PATENT OFFICE.

NATSUO SATO, OF SAN FRANCISCO, CALIFORNIA.

ILLUMINATED AQUARIUM.

1,297,254.  Specification of Letters Patent.  Patented Mar. 11, 1919.

Application filed June 14, 1918. Serial No. 239,980.

*To all whom it may concern:*

Be it known that I, NATSUO SATO, a citizen of the United States, residing at San Francisco, in the county of San Francisco and State of California, have invented new and useful Improvements in Illuminated Aquariums, of which the following is a specification.

This invention relates to improvements in aquariums or bowls containing water in which fish are visible, and the object of the invention is to provide such an aquarium or bowl which will be brilliantly illuminated by electric lamps supported centrally above the bowl, in which the cords of said lamps can extend through the center of the bowl to said lamps and be concealed from view when so extending, in which the means for such concealment will not injure the health of the fish, and in which the lamps and electrical connections can be readily disconnected and removed, when it is desired to change the location of the aquarium.

In the accompanying drawing, Figure 1 is a broken side view, showing a bowl, lamp and lamp shade, constructed in accordance with my invention; Fig. 2 is a detail vertical sectional view thereof; Fig. 3 is a similar view of a modification thereof, certain portions being shown in side elevation, and Figs. 4 and 5 are perspective views of different forms of stands for supporting food for the fishes contained in said bowl.

Referring to the drawing, 1 indicates a base or stand, in the center of which is secured a short internally threaded metallic sleeve 2, (Figs. 2, 3). Screwed into said sleeve 2 is an externally threaded lower end of a metal pipe 3 extending upwardly through the center of a bowl 4 of glass or of other material not affected by water. Upon the upper end of said pipe 3 is screwed a metallic casing 6 for containing electric connections and wires, to which casing are secured lamp sockets 7, (one only here shown) in which are electric lamps 8. Upon the upper end of said casing 6 is supported a lamp shade 9, which reflects the light from the lamps on to the bowl beneath.

The water in said bowl, if allowed to come into contact with the external surface of the pipe 3, would, if said pipe were made of any metal ordinarily used for piping, soon become so contaminated by the action of the metal thereon that it would injure the health of the fish contained in the bowl and they would soon die. To avoid this result I inclose the metal pipe 3 in an outer tube 11 of glass which, as shown in Fig. 3, may be formed in one piece with the bowl, or, as shown in Fig. 2, may be in a separate piece therefrom and cemented together.

The wires 13 of the electric lamps have terminals 14, which can be inserted in sockets in a switch box 17 connected by a cord 18 with a plug 19. This arrangement permits of the electric connections to the lamps being conveniently attached to the bowl.

In order to present a pleasing appearance, it is desirable that the bowl should have therein a bed 21 of sand, gravel or the like, in which can grow aqueous flora 22. However, some vegetable growths make it difficult for the fish to obtain access to food allowed to sink to the bottom of the bowl. To overcome this difficulty I provide a glass plate or holder 23, having a stem 24, as shown in Fig. 4, or having a hanger 25, as shown in Fig. 5, and upon which the food may be placed at a sufficient height above the grasses and other vegetable growths in the bowl to enable the fish to have easy access thereto.

It will be observed that the above described construction permits of the lamp shade, lamp and the pipe 13, being easily detached, so that the bowl and stand can be separated from the electric connections and removed to the outer air or other place where it may be desired.

I claim:—

An ornamental aquarium comprising a glass bowl having at the center a glass tube extending upwardly from the bottom of the bowl to a height above the level of the water therein, said tube having a watertight connection with the bottom of the bowl, a stand for supporting the bowl, a pipe extending through the glass tube, its lower end being removably secured in a hole in said stand, a hollow support for electric lamps secured upon the top of said pipe, a lamp shade supported by said support, and a lamp cord extending through the pipe into said hollow support for connection with the lamp sockets.

N. SATO.